United States Patent
Tarafdar et al.

(10) Patent No.: US 8,245,784 B2
(45) Date of Patent: Aug. 21, 2012

(54) STABLE ORGANIC-BASED FLUID LOSS ADDITIVE CONTAINING AN ORGANOPHILIC CLAY-BASED SUSPENDING AGENT FOR USE IN A WELL

(75) Inventors: Abhijit Tarafdar, Pune (IN); Remitha Ak, Pune (IN)

(73) Assignee: Halliburton Energy Services, Inc., Duncan, OK (US)

( * ) Notice: Subject to any disclaimer, the term of this patent is extended or adjusted under 35 U.S.C. 154(b) by 253 days.

(21) Appl. No.: 12/795,408

(22) Filed: Jun. 7, 2010

(65) Prior Publication Data

US 2011/0297377 A1 Dec. 8, 2011

(51) Int. Cl.
*E21B 33/13* (2006.01)
(52) U.S. Cl. ....................................... 166/293
(58) Field of Classification Search .................. None
See application file for complete search history.

(56) References Cited

U.S. PATENT DOCUMENTS

| | | | |
|---|---|---|---|
| 4,515,635 A | | 5/1985 | Rao et al. |
| 4,687,516 A | * | 8/1987 | Burkhalter et al. ........... 106/719 |
| 4,828,034 A | | 5/1989 | Constien et al. |
| 6,451,743 B1 | | 9/2002 | Fox |
| 6,983,800 B2 | | 1/2006 | Chatterji et al. |
| 2008/0308275 A1 | * | 12/2008 | Brothers et al. ............... 166/295 |
| 2010/0122816 A1 | | 5/2010 | Lewis et al. |

OTHER PUBLICATIONS

Halliburton Halad®-344 Fluid-Loss Additive product brochure H01331, 1998, 2 pages.
Halliburton Suspentone™ Suspension Agent product data sheet, Mar. 30, 2010, 1 page.

* cited by examiner

*Primary Examiner* — Angela M DiTrani
(74) *Attorney, Agent, or Firm* — Craig W. Roddy; Sheri Higgins Law

(57) ABSTRACT

A well treatment composition comprises: a water-soluble, organic liquid, wherein the organic liquid comprises the continuous phase of the well treatment composition, and wherein the organic liquid comprises a polyglycol or a derivative of polyglycol; a fluid loss additive, wherein the fluid loss additive is insoluble in the organic liquid, and wherein the fluid loss additive comprises a high molecular weight, water-swellable polymer; and a suspending agent, wherein the suspending agent comprises an organophilic clay, wherein the well treatment composition has an activity of at least 15%. A method of cementing in a subterranean formation comprises: introducing a cement composition into the subterranean formation, the cement composition comprising: (i) cement; (ii) water; and (iii) the well treatment composition; and allowing the cement composition to set after introduction into the subterranean formation.

19 Claims, No Drawings

STABLE ORGANIC-BASED FLUID LOSS ADDITIVE CONTAINING AN ORGANOPHILIC CLAY-BASED SUSPENDING AGENT FOR USE IN A WELL

TECHNICAL FIELD

A well treatment composition is provided. The well treatment composition comprises an organic based fluid loss control additive. A method of preparation of the well treatment composition is also provided. A method of cementing in a subterranean formation using the well treatment composition is also provided. In an embodiment, the subterranean formation is penetrated by a well.

SUMMARY

According to an embodiment, a well treatment composition comprises: a water-soluble, organic liquid, wherein the organic liquid comprises the continuous phase of the well treatment composition, and wherein the organic liquid comprises a polyglycol or a derivative of polyglycol; a fluid loss additive, wherein the fluid loss additive is insoluble in the organic liquid, and wherein the fluid loss additive comprises a high molecular weight, water-swellable polymer; and a suspending agent, wherein the suspending agent comprises an organophilic clay, wherein the well treatment composition has an activity of at least 15%.

According to another embodiment, a method of cementing in a subterranean formation comprises: introducing a cement composition into the subterranean formation, the cement composition comprising: (i) cement; (ii) water; and (iii) the well treatment composition; and allowing the cement composition to set.

DETAILED DESCRIPTION

As used herein, the words "comprise," "have," "include," and all grammatical variations thereof are each intended to have an open, non-limiting meaning that does not exclude additional elements or steps.

It should be understood that, as used herein, "first," "second," and "third," are arbitrarily assigned and are merely intended to differentiate between two or more monomers, fluids, etc., as the case may be, and does not indicate any sequence. Furthermore, it is to be understood that the mere use of the term "first" does not require that there be any "second," and the mere use of the term "second" does not require that there be any "third," etc.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas. As used herein, a "fluid" can have more than one distinct phase. For example, a "fluid" can be a colloid. As used herein, a "colloid" is a two-phase system in which the dispersed phase remains suspended in the continuous phase and does not settle out of the continuous phase. A colloid can be: a sol, which includes a continuous liquid phase and undissolved nanometer-sized solid particles (<500 nm) as the dispersed phase; an emulsion, which includes a continuous liquid phase and at least one dispersed phase of immiscible liquid droplets; or a foam, which includes a continuous liquid phase and a gas as the dispersed phase. Another example of a fluid having more than one distinct phase is a suspension. As used herein, a "suspension" is a two-phase system with micron-sized solid particles dispersed in a liquid continuous phase in which the dispersed phase can settle out of the continuous phase over time or through centrifugation.

As used herein, the term "organic-based" means a suspension or a colloid in which an organic liquid is the continuous phase. As used herein, the term "organic" means a compound that contains carbon chemically bound to hydrogen. An organic compound can contain other elements, for example, oxygen or nitrogen. As used herein, the term "oil-based" means a suspension or a colloid in which a hydrocarbon liquid is the continuous phase. As used herein, the term "water-based" means a suspension or a colloid in which an aqueous liquid is the continuous phase.

As used herein, a "cement composition" is a mixture of at least cement and water, and possibly other additives. As used herein, the term "cement" means an initially dry substance that, in the presence of water, acts as a binder to bind other materials together.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

A well can be an oil, gas, water, or injection well. As used herein, a "well" includes at least one wellbore. A wellbore can include vertical, inclined, and horizontal portions, and it can be straight, curved, or branched. As used herein, the term "wellbore" includes any cased, and uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 100 feet of the wellbore. As used herein, "into a well" means and includes into any portion of the well, including into the wellbore or into the near-wellbore region via the wellbore.

A portion of a wellbore may be an open hole or cased hole. In a typical open-hole wellbore portion, a tubing string can be placed into the wellbore. The tubing string allows fluids to be introduced into or flowed from a remote portion of the wellbore. In a cased-hole wellbore portion, a casing is placed into the wellbore which can also contain a tubing string. A wellbore can contain an annulus. Examples of an annulus include, but are not limited to: the space between the wellbore and the outside of a tubing string in an open-hole wellbore; the space between the wellbore and the outside of the casing in a cased-hole wellbore; and the space between the tubing string and the inside of the casing in a cased-hole wellbore.

During well completion, it is common to introduce a cement composition into an annulus in a wellbore. For example, in a cased-hole wellbore, a cement composition can be placed into and allowed to set in the annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in well-plugging operations or gravel-packing operations.

However, fluids, such as water, included in a cement composition can penetrate into the surrounding subterranean formation. This is commonly referred to as fluid loss. The loss of significant amounts of fluid from the cement composition into the formation can adversely affect, inter alia, the viscosity, thickening time, setting time, and compressive strength of the cement composition. Therefore, it is common to include a fluid loss additive in a cement composition in order to help minimize the amount of fluid that is lost from the cement composition into the subterranean formation.

It is sometimes beneficial to add a well treatment composition containing an additive to a cement composition as a liquid concentrate. For example, a liquid concentrate can be prepared as a colloid. More specifically, a liquid concentrate can be prepared as a slurry. The liquid concentrate can be prepared and can then be added to cement, water, and any other ingredients on the fly at a work site to form a cement composition. The cement composition can then be introduced into a subterranean formation.

Water-swellable polymers have been used as a fluid loss additive. A polymer is a large molecule composed of repeating units typically connected by covalent chemical bonds. A polymer is formed from the polymerization reaction of monomers. A polymer formed from one type of monomer is called a homopolymer. A polymer can be formed from two or more different types of monomers, and is called a copolymer. In the polymerization reaction, the monomers are transformed into the repeating units of a polymer. The number of repeating units of a polymer can range from approximately 4 to greater than 10,000. The number of repeating units of a polymer is referred to as the chain length of the polymer. The conditions of the polymerization reaction can be adjusted to help control the average number of repeating units (the average chain length) of a polymer. A polymer also has an average molecular weight, which is directly related to the average chain length of the polymer. The average molecular weight of a polymer has an impact on some of the physical characteristics of a polymer, for example, its solubility in water.

The average molecular weight for a copolymer can be expressed as follows:

$$\text{Avg. molecular weight} = (M.W.m_1 * RUm_1) + (M.W.m_2 * RUm_2)$$

where $M.W.m_1$ is the molecular weight of the first monomer; $RU\, m_1$ is the number of repeating units of the first monomer; $M.W.m_2$ is the molecular weight of the second monomer; and $RU\, m_2$ is the number of repeating units of the second monomer. Of course, a terpolymer would include three monomers, a tetrapolymer would include four monomers, and so on.

Polymer molecules can be cross-linked. As used herein, a "cross-link" or "cross-linking" is a connection between two or more polymer molecules. Cross-linking the polymer molecules can increase the molecular weight of the polymer. In general, as the molecular weight of a polymer or cross-linked polymer increases, its solubility decreases. As a result, some high molecular weight polymers can become water swellable when their molecular weight increases above a certain limit. As used herein, the term "water swellable" means a polymer or cross-linked polymer that can absorb water and can swell. As used herein, a "low molecular weight polymer" means a polymer or cross-linked polymer with an average molecular weight of less than 50,000. As used herein, a "high molecular weight polymer" means a polymer or a cross-linked polymer with an average molecular weight of 50,000 or greater.

For a copolymer, the repeating units for each of the monomers can be arranged in various ways along the polymer chain. For example, the repeating units can be random, alternating, periodic, or block.

It can be difficult to make a water-based fluid loss concentrate with some water-swellable polymers because the polymer can form fish eyes in the aqueous liquid. A fish eye generally occurs during the process of blending the water-swellable polymer with the aqueous liquid. Fish eyes are balls of unhydrated polymer surrounded by a gelatinous covering of hydrated polymer. Fish eyes prevent water from contacting the interior of the fish eye and the unhydrated polymer contained therein. Fish eyes can be difficult to break apart once formed. A liquid concentrate containing fish eyes is not a homogenous system. As used herein, the term "homogenous" means a suspension or a colloid in which the dispersed phase is uniformly dispersed throughout the continuous liquid phase. It is desirable to have a homogenous liquid concentrate.

In order to avoid the problem of fish-eye formation, an oil-based suspension containing a water-swellable polymer can be used. However, an oil-based suspension containing a water-swellable polymer can have poor stability. The water-swellable polymer in an oil-based concentrate can also stick onto the wall of a container, which can cause difficulty during pouring. Instability refers to a suspension, in which the uniformly dispersed undissolved solids settle out of the liquid continuous phase over time. By contrast, a stable suspension can remain homogenous over the course of several days to several months.

Another problem with using an oil-based suspension is that the hydrocarbon liquid may not be biodegradable or biocompatible. Because many countries have implemented environmental regulations specifying the types of fluids and chemicals that may and may not be used in a well, certain oil-based concentrates can be prohibited from being used in a well. Moreover, for an oil-based suspension, the hydrocarbon liquid is not mixable with the water-based cement composition. As a result, surfactants and other chemicals are required to emulsify the oil in the cement composition, which leads to a more complicated system. Yet another problem with using an oil-based suspension is that the hydrocarbon liquid is hydrophobic in nature where most fluid loss additives are hydrophilic in nature. Thus, the hydrophilic fluid loss additive may not form positive interactions with the hydrophobic hydrocarbon liquid. This may lead to particle agglomeration through particle-particle interaction and may accelerate settling of the fluid loss additive.

In addition to the problem of fish-eye formation, a water-based concentrate that contains a water-swellable polymer can become too viscous to pour the concentrate out of a blending or storage container to be included in a cement composition. Viscosity is a measure of the resistance of a fluid to flow, defined as the ratio of shear stress to shear rate. Viscosity can be expressed in units of (force*time)/area. For example, viscosity can be expressed in units of $\text{dyne}*s/cm^2$ (commonly referred to as Poise (P)), or expressed in units of Pascals/second (Pa/s). However, because a material that has a viscosity of 1 P is a relatively viscous material, viscosity is more commonly expressed in units of centipoise (cP), which is $\frac{1}{100}$ P. The viscosity of a material and pourability are related. The higher the viscosity, the less easily the material can be poured. Conversely, the lower the viscosity, the more easily the material can be poured. It is desirable for a liquid concentrate to be pourable.

As used herein, the "viscosity" of a material is measured according to API RP 10B-2/ISO 10426-2 as follows. The material to be tested, such as a slurry, is prepared. The material is placed into the test cell of a rotational viscometer, such as a FANN® Model 35 viscometer, fitted with a FANN® yield stress adapter (FYSA) and spring number 1. The material is tested at ambient temperature and pressure, about 71° F. (22° C.) and about 1 atm (0.1 MPa). Viscosity can be calculated using the following equation, expressed in units of centipoise:

$$V = \frac{k_1}{k_2}(1000)\frac{\theta}{N}$$

where $k_1$ is a constant that depends on the FYSA in units of 1/s; $k_2$ is a constant that depends on the FYSA in units of Pa; (1000) is the conversion constant from Pa*s to centipoise; $\theta$ is the dial reading on the viscometer; and N is the rpm.

Rheology is a unit-less measure of how a material deforms and flows. Rheology includes the material's elasticity, plasticity, and viscosity. As used herein, the "rheology" of a material, such as a slurry or a cement composition, is measured as follows. The material to be tested is prepared. The material is placed into the test cell of a rotational viscometer, such as a FANN® Model 35 viscometer, fitted with a FYSA attachment and a spring number 1. The material is tested at ambient temperature and pressure, about 71° F. (22° C.) and about 1 atm (0.1 MPa). Rheology readings are taken at multiple rpm's, for example, at 3, 6, 30, 60, 100, 200, and 300.

Another desirable characteristic of a liquid concentrate is a high amount of activity. As used herein, the term "activity" means the total percent of active solids in a liquid. For example, a liquid concentrate can have an activity of 10%, which means that there is 10 gm of active solid present in 100 gm of liquid concentrate. It is believed that the activity of a liquid concentrate can be increased by increasing the homogeneity of the concentrate. It is also believed that the activity of a liquid concentrate can be increased by increasing active solid loading in the suspension.

It has been discovered that a well treatment composition can be made as a liquid concentrate comprising: a water-soluble, organic liquid; a high molecular weight, water-swellable polymer as a fluid loss additive; and an organophilic clay suspending agent. Some of the advantages of the well treatment composition is that the composition: is more homogenous; is more stable; is less viscous; pours more easily; is soluble in water; and has a higher activity compared to some oil- and water-based concentrates.

A liquid concentrate can be added to cement, water, and possibly other additives to form a cement composition. During cementing operations, it is desirable for the cement composition to remain pumpable during introduction into the subterranean formation and until the cement composition is situated in the portion of the subterranean formation to be cemented. After the cement composition has reached the portion of the subterranean formation to be cemented, the cement composition can ultimately set. A cement composition that thickens too quickly while being pumped can damage pumping equipment or block tubing or pipes, and a cement composition that sets too slowly can cost time and money while waiting for the composition to set.

If any test (e.g., thickening time or compressive strength) requires the step of mixing, then the cement composition is "mixed" according to the following procedure. The water is added to a mixing container and the container is then placed on a mixer base. The motor of the base is then turned on and maintained at 4,000 revolutions per minute (rpm). The cement and any other ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s). It is to be understood that the cement composition is mixed at ambient temperature and pressure (about 71° F. (22° C.) and about 1 atm (0.1 MPa)).

It is also to be understood that if any test (e.g., thickening time or compressive strength) specifies the test be performed at a specified temperature and possibly a specified pressure, then the temperature and pressure of the cement composition is ramped up to the specified temperature and pressure after being mixed at ambient temperature and pressure. For example, the cement composition can be mixed at 71° F. (22° C.) and 1 atm (0.1 MPa) and then placed into the testing apparatus and the temperature of the cement composition can be ramped up to the specified temperature. As used herein, the rate of ramping up the temperature is in the range of about 3° F./min to about 5° F./min (about −16° C./min to about −15° C./min). After the cement composition is ramped up to the specified temperature and possibly pressure, the cement composition is maintained at that temperature and pressure for the duration of the testing.

As used herein, the "thickening time" is how long it takes for a cement composition to become unpumpable at a specified temperature and pressure. The pumpability of a cement composition is related to the consistency of the composition. The consistency of a cement composition is measured in Bearden units of consistency (Bc), a dimensionless unit with no direct conversion factor to the more common units of viscosity. As used herein, a cement composition becomes "unpumpable" when the consistency of the composition reaches 70 Bc. As used herein, the consistency of a cement composition is measured as follows. The cement composition is mixed. The cement composition is then placed in the test cell of a High-Temperature, High-Pressure (HTHP) consistometer, such as a FANN® Model 275 or a Chandler Model 8240. Consistency measurements are taken continuously until the cement composition exceeds 70 Bc.

A cement composition can develop compressive strength. Cement composition compressive strengths can vary from 0 psi to over 10,000 psi (0 to over 69 MPa). Compressive strength is generally measured at a specified time after the composition has been mixed and at a specified temperature and pressure. Compressive strength can be measured, for example, at a time of 24 hours. According to ANSI/API Recommended Practice 10B-2, compressive strength can be measured by either a destructive method or non-destructive method.

The destructive method mechanically tests the compressive strength of a cement composition sample taken at a specified time after mixing and by breaking the samples in a compression-testing device, such as a Super L Universal testing machine model 602, available from Tinius Olsen, Horsham in Pennsylvania, USA. According to the destructive method, the compressive strength is calculated as the force required to break the sample divided by the smallest cross-sectional area in contact with the load-bearing plates of the compression-testing device. The compressive strength is reported in units of pressure, such as pound-force per square inch (psi) or megapascals (MPa).

The non-destructive method continually measures correlated compressive strength of a cement composition sample throughout the test period by utilizing a non-destructive sonic device such as an Ultrasonic Cement Analyzer (UCA) available from FANN® Instruments in Houston, Tex., USA. As used herein, the "compressive strength" of a cement composition is measured using the non-destructive method at a specified time, temperature, and pressure as follows. The cement composition is mixed. The cement composition is then placed in an Ultrasonic Cement Analyzer and tested at a specified temperature and pressure. The UCA continually measures the transit time of the acoustic signal through the sample. The UCA device contains preset algorithms that correlate transit time to compressive strength. The UCA reports the compressive strength of the cement composition in units of pressure, such as psi or MPa.

The compressive strength of a cement composition can be used to indicate whether the cement composition has initially set or set. As used herein, a cement composition is considered "initially set" when the cement composition develops a compressive strength of 50 psi (0.3 MPa) using the non-destructive compressive strength method at a temperature of 212° F. (100° C.) and a pressure of 3,000 psi (20 MPa). As used herein, the "initial setting time" is the difference in time between when the cement and any other ingredients are added to the water and when the composition is initially set.

As used herein, the term "set," and all grammatical variations thereof, are intended to mean the process of becoming hard or solid by curing. As used herein, the "setting time" is the difference in time between when the cement and any other ingredients are added to the water and when the composition has set at a specified temperature. It can take up to 48 hours or longer for a cement composition to set. Some cement compositions can continue to develop compressive strength over the course of several days. The compressive strength of a cement composition can reach over 10,000 psi (69 MPa).

Fluid loss from a cement composition can occur. As used herein, the "fluid loss" of a cement composition is tested according to the API static fluid loss procedure at a specified temperature and pressure differential as follows. The cement composition is mixed. The cement composition is placed into an atmospheric consistometer, such as a FANN® Model 165 AT consistometer, heated to the specified temperature, and then maintained at the specified temperature for 20 minutes. A test cell of a fluid loss test assembly, such as a FANN® fluid loss test assembly, is pre-heated to the specified temperature. The cement composition is then placed into the test cell of the fluid loss test assembly. The cement composition is then tested for fluid loss at the specified pressure differential. Fluid loss is measured in milliliters (mL) per 30 minutes (min). The total mL of fluid loss is then multiplied by 2 to obtain the API fluid loss for the cement composition and expressed in units of mL/30 min.

According to an embodiment, a well treatment composition comprises: a water-soluble, organic liquid, wherein the organic liquid comprises the continuous phase of the well treatment composition, and wherein the organic liquid comprises a polyglycol or a derivative of polyglycol; a fluid loss additive, wherein the fluid loss additive is insoluble in the organic liquid, and wherein the fluid loss additive comprises a high molecular weight, water-swellable polymer; and a suspending agent, wherein the suspending agent comprises an organophilic clay, wherein the well treatment composition has an activity of at least 15%.

According to another embodiment, a method of cementing in a subterranean formation comprises: introducing a cement composition into the subterranean formation, the cement composition comprising: (i) cement; (ii) water; and (iii) the well treatment composition; and allowing the cement composition to set.

The discussion of preferred embodiments regarding the well treatment composition, or any ingredient in the well treatment composition, is intended to apply to the composition embodiments and the method embodiments. Any reference to the unit "gallons" means U.S. gallons. As used herein, the term "soluble" means that at least 1 part of the substance dissolves in 20 parts of the liquid at a temperature of 75° F. (24° C.) and a pressure of 1 atm (0.1 MPa). As used herein, the term "insoluble" means that less than 1 part of the substance dissolves in 20 parts of the liquid at a temperature of 75° F. (24° C.) and a pressure of 1 atm (0.1 MPa).

The well treatment composition includes a water-soluble, organic liquid, wherein the organic liquid comprises the continuous phase of the well treatment composition, and wherein the organic liquid comprises a polyglycol or a derivative of polyglycol. The well treatment composition can be a liquid concentrate. The well treatment composition can be a colloid, wherein the organic liquid comprises the continuous phase of the colloid. For a colloid, the organic liquid can contain dissolved solids. In one embodiment, the well treatment composition is a suspension.

It is preferred that the organic liquid is biocompatible. As used herein, "biocompatible" means the quality of not having toxic or injurious effects on biological systems. For example, if the well treatment composition is used in off-shore drilling, then a release of the organic liquid into the water would not be harmful to aquatic life.

The organic liquid comprises a polyglycol or a derivative of polyglycol. In an embodiment, the organic liquid is a linear homopolymer. The organic liquid can be selected from the group consisting of polyether glycol, polyester glycol, polyether ester glycol, and any combination thereof. In one embodiment, the organic liquid has an average molecular weight of at least 150. In another embodiment, the organic liquid has an average molecular weight of at least 200. In another embodiment, the organic liquid has an average molecular weight in the range of about 150 to about 1,000.

The well treatment composition includes a fluid loss additive, wherein the fluid loss additive is insoluble in the organic liquid, and wherein the fluid loss additive comprises a high molecular weight, water-swellable polymer. It is preferable that the fluid loss additive is non-retarding. As used herein, the term "non-retarding" means the fluid loss additive does not substantially delay the setting time of a cement composition that contains the fluid loss additive compared to a substantially identical cement composition except without the fluid loss additive.

The polymer for the fluid loss additive can comprise: cellulose; guar; xanthan; starch; a monomer or monomers selected from the group consisting of acrylamido-methyl-propane sulfonate (AMPS), N-vinyl-N-methylaceamide, N-vinylformamide, N-vinylpyrrolidone, acrylonitrile, acrylamide, acrylomorpholine, vinyl alcohol, maleic anhydride, acrylic acid, methacrylic acid; derivatives of any of the foregoing; and any combination thereof. Preferably, the polymer is a copolymer. For a copolymer, preferably one of the monomers is AMPS. If the polymer is a copolymer, then the repeating units of the polymer can be random. Suitable commercially-available examples of a fluid loss additive include, but are not limited to, HALAD® 344, HALAD® 300, and HALAD® 400, marketed by Halliburton in Duncan, Okla., USA.

The polymer for the fluid loss additive is a high molecular weight polymer. The polymer can have an average molecular weight of at least 50,000. In one embodiment, the polymer has an average molecular weight in the range of about 50,000 to about 2,000,000. In another embodiment, the polymer has an average molecular weight in the range of about 500,000 to about 1,250,000.

The polymer for the fluid loss additive is generally water swellable.

In one embodiment, the fluid loss additive is in a concentration of at least 15% by weight of the well treatment composition. In another embodiment, the fluid loss additive is in a concentration in the range of about 15% to about 80% by weight of the well treatment composition. In another embodiment, the fluid loss additive is in a concentration in the range of about 20% to about 50% by weight of the well treatment composition.

The well treatment composition includes a suspending agent, wherein the suspending agent comprises an organophilic clay. As used herein, the term "suspending agent" means a material that is capable of suspending solid particles with a mesh size below 60 in an organic liquid for a period of at least 5 hours at a temperature of 71° F. (22° C.). Any suspending agent that is an organophilic clay and capable of suspending solid particles in the continuous phase of the well treatment composition is suitable for use in the liquid concentrate. Preferably, the suspending agent is insoluble in the organic liquid. As used herein, an "organophilic clay" is a clay possessing a cationic exchange capacity that has been coated with a fatty-acid quaternary amine that associates with an organic liquid. Examples of suitable clays are organophilic bentonite, hectorite, attapulgite, sepiolite, and combinations thereof. Preferably, the clay is organophilic attapulgite. A commercially available example of an organophilic clay is SUSPENTONE®, marketed by Halliburton in Duncan, Okla., USA.

In one embodiment, the suspending agent is in a concentration of at least 0.05% by weight of the well treatment composition. In another embodiment, the suspending agent is in a concentration in the range of about 0.05% to about 5% by weight of the well treatment composition. In another embodiment, the suspending agent is in a concentration in the range of about 0.75% to about 3% by weight of the well treatment composition.

It is preferred that the well treatment composition is homogenous. Preferably, the suspending agent is in at least a sufficient concentration such that the liquid concentrate is homogenous.

In one embodiment, the well treatment composition has a viscosity such that the well treatment composition is capable of being poured. For example, if the well treatment composition is to be included in a cement composition, then the well treatment composition can be poured from a container into a different mixing apparatus for forming the cement composition. In one embodiment, the well treatment composition has a viscosity of less than 50,000 cP (50,000 millipascals/second "mPa/s"). Preferably, the suspending agent is in a concentration equal to or less than a sufficient concentration such that the well treatment composition has a viscosity of less than 50,000 cP. Preferably, the fluid loss additive is in a concentration equal to or less than a sufficient concentration such that the well treatment composition has a viscosity of less than 50,000 cP. In another embodiment, the well treatment composition has a viscosity of less than 25,000 cP (25,000 mPa/s).

In one embodiment, the well treatment composition has an activity of at least 15%. Preferably, the suspending agent is in at least a sufficient concentration such that the well treatment composition has an activity of at least 15%. In another embodiment, the well treatment composition has an activity of at least 40%. In another embodiment, the well treatment composition has an activity of at least 60%.

According to an embodiment, a method for cementing in a subterranean formation comprises: introducing a cement composition into the subterranean formation, the cement composition comprising: (i) cement; (ii) water; and (iii) the well treatment composition; and allowing the cement composition to set.

The method can further include the step of making the well treatment composition prior to the step of introducing. According to this embodiment, the step of making comprises blending the well treatment composition. Preferably, the well treatment composition is blended such that the well treatment composition is homogenous. Preferably, the well treatment composition is blended for a sufficient length of time to provide a homogenous well treatment composition. The well treatment composition can be blended via stirring the well treatment composition with a mechanical stirrer or mixing the well treatment composition with a constant-speed blender. Preferably, the well treatment composition is blended using a constant-speed blender and is blended at 4,000 rpm.

The method can further include the step of pre-blending the organic liquid and the suspending agent. According to this embodiment, the step of pre-blending is performed, then the fluid loss additive is added to the pre-blended mixture, then the step of blending is performed. The method can further include the step of heating the organic liquid to a temperature of at least 176° F. (80° C.) before the step of blending or before the step of pre-blending. If a pre-blending step is included in the method, then the pre-blending step can further include the step of allowing to cool or cooling the organic liquid/suspending agent mixture prior to the step of adding the fluid loss additive. By way of example, the well treatment composition can be blended according to the following procedure. First, the organic liquid is heated to a temperature of at least 176° F. (80° C.). Second, the organic liquid is added to a pre-heated blending container, then the suspending agent is added to the blending container, and then the organic liquid and the suspending agent are pre-blended. Preferably, the organic liquid and suspending agent are pre-blended for at least 5 minutes at 4,000 rpm. Third, the organic liquid/suspending agent mixture is cooled or allowed to cool to a temperature of about 122° F. (50° C.). Fourth, the fluid loss additive is added to the blending container. Fifth, the step of blending is performed for at least 5 min at 4,000 rpm.

The method for making the well treatment composition can further include the step of storing the well treatment composition after the step of blending and prior to the step of introducing. In one embodiment, the well treatment composition is capable of being stored and during storage, the well treatment composition maintains the following characteristics: it is stable, it is homogenous, and it is capable of being poured. Preferably, the well treatment composition is capable of being stored for a time of 6 months or more, while maintaining the characteristics listed above.

The cement composition includes cement. The cement can be Class A cement, Class C cement, Class G cement, Class H cement, and any combination thereof. Preferably, the cement is Class G cement or Class H cement.

The cement composition includes water. The water can be selected from the group consisting of freshwater, brackish water, saltwater, and any combination thereof. The cement composition can further include a water-soluble salt. As used herein, "water-soluble salt" means greater than 1 part of the salt dissolves in 5 parts of water at a temperature of 80° F. (27° C.). Preferably, the salt is selected from sodium chloride, calcium chloride, calcium bromide, potassium chloride, potassium bromide, magnesium chloride, and any combination thereof. The cement composition can contain the water-soluble salt in a concentration in the range of about 5% to about 35% by weight of the water (bww).

The cement composition includes the fluid loss additive for the well treatment composition. In one embodiment, the fluid loss additive is in a concentration of at least 0.05% by weight of the cement (bwc). In another embodiment, the fluid loss additive is in a concentration of at least 1% bwc. In another embodiment, the fluid loss additive is in a concentration in the range of about 0.05% to about 5% bwc.

The cement composition includes the suspending agent for the well treatment composition. In one embodiment, the suspending agent is in a concentration of at least 0.01% bwc. In another embodiment, the suspending agent is in a concentration in the range of about 0.01% to about 2% bwc. In another embodiment, the suspending agent is in a concentration in the range of about 0.02% to about 1% bwc.

In an embodiment, the cement composition has a thickening time of at least 3 hours at a temperature of 125° F. (51° C.) and a pressure of 5,160 psi (36 MPa). In another embodiment, the cement composition has a thickening time in the range of about 4 to about 15 hours at a temperature of 125° F. (51° C.) and a pressure of 5,160 psi (36 MPa). Some of the variables that can affect the thickening time of the cement composition include the concentration of any set retarder included in the cement composition, the concentration of any salt present in the cement composition, and the bottomhole temperature of the subterranean formation. As used herein, the term "bottomhole" refers to the portion of the subterranean formation to be cemented. In another embodiment, the cement composition has a thickening time of at least 3 hours at the bottomhole temperature and pressure of the subterranean formation.

In one embodiment, the cement composition has an initial setting time of less than 24 hours at a temperature of 125° F. (51° C.) and a pressure of 3,000 psi (21 MPa). In another embodiment, the cement composition has an initial setting time of less than 24 hours at the bottomhole temperature and pressure of the subterranean formation.

Preferably, the cement composition has a setting time of less than 48 hours at a temperature of 125° F. (51° C.). More preferably, the cement composition has a setting time of less than 24 hours at a temperature of 125° F. (51° C.). Most preferably, the cement composition has a setting time in the range of about 3 to about 24 hours at a temperature of 125° F. (51° C.). In another embodiment, the cement composition has a setting time of less than 48 hours at the bottomhole temperature and pressure of the subterranean formation.

Preferably, the cement composition has a compressive strength of at least 500 psi (3.5 MPa) when tested at 24 hours, a temperature of 125° F. (51° C.), and a pressure of 3,000 psi (21 MPa). More preferably, the cement composition has a compressive strength in the range of about 500 to about 10,000 psi (about 3.5 to about 69 MPa) when tested at 24 hours, a temperature of 125° F. (51° C.), and a pressure of 3,000 psi (21 MPa).

In one embodiment, the cement composition has an API fluid loss of less than 155 mL/30 min at a temperature of 125° F. (51° C.) and a pressure differential of 1,000 psi (7 MPa). Preferably, the fluid loss additive is in at least a sufficient concentration such that the cement composition has the desired API fluid loss. In another embodiment, the cement composition has an API fluid loss of less than 100 mL/30 min at a temperature of 125° F. (51° C.) and a pressure differential of 1,000 psi (7 MPa). In another embodiment, the cement composition has an API fluid loss of less than 60 mL/30 min at a temperature of 125° F. (51° C.) and a pressure differential of 1,000 psi (7 MPa).

The cement composition can further include an additional additive. Examples of an additional additive include, but are not limited to, a filler, a set retarder, a friction reducer, a strength-retrogression additive, a high-density additive, a set accelerator, a mechanical property enhancing additive, a lost-circulation material, a filtration-control additive, a defoaming agent, a thixotropic additive, a nano-particle, and combinations thereof.

The cement composition can include a filler. Suitable examples of fillers include, but are not limited to, fly ash, sand, clays, and vitrified shale. Preferably, the filler is in a concentration in the range of about 5% to about 50% by weight of the cement (bwc).

The cement composition can include a set retarder. Suitable examples of commercially-available set retarders include, but are not limited to, HR®4, HR®5, HR®6, HR®12, HR®20, HR®25, SCR®100 and SCR®500, marketed by Halliburton in Duncan, Okla., USA. Preferably, the set retarder is in a concentration in the range of about 0.05% to about 10% bwc.

The cement composition can include a friction reducer. Suitable examples of commercially-available friction reducers include, but are not limited to, CFR®2, CFR®3, CFR®5LE, CFR®6, and CFR®8, marketed by Halliburton in Duncan, Okla., USA. Preferably, the friction reducer is in a concentration in the range of about 0.1% to about 10% bwc.

The cement composition can include a strength-retrogression additive. Suitable examples of commercially-available strength-retrogression additives include, but are not limited to, SSA®1 and SSA®2, marketed by Halliburton in Duncan, Okla., USA. Preferably, the strength-retrogression additive is in a concentration in the range of about 5% to about 50% bwc.

Commercially-available examples of other additives include, but are not limited to: HIGH DENSE® No. 3, HIGH DENSE® No. 4, BARITET™, and MICROMAX™, heavyweight additives: SILICALITE™, extender and compressive-strength enhancer; WELLLIFE® 665, WELLLIFE® 809, and WELLLIFE® 810 mechanical property enhancers (marketed by Halliburton Energy Services, Inc. in Duncan, Okla., USA); and HGS6000™, HGS4000™, and HGS10000™ low-density additives (available from 3M in St. Paul, Minn., USA).

In one embodiment, the cement composition has a density of at least 10 pounds per gallon (ppg) (1.2 kilograms per liter (kg/l)). In another embodiment, the cement composition has a density of at least 15 ppg (1.8 kg/l). In another embodiment, the cement composition has a density in the range of about 15 to about 20 ppg (about 1.8 to about 2.4 kg/l)

The method includes the step of introducing the cement composition into a subterranean formation. The step of introducing is for the purpose of at least one of the following: well completion; foam cementing; primary or secondary cementing operations; well-plugging; and gravel packing. The cement composition can be in a pumpable state before and during introduction into the subterranean formation.

In one embodiment, the cement composition is used in a subterranean formation having a bottomhole temperature of at least 150° F. (66° C.). In another embodiment, the bottomhole temperature is in the range of about 150° F. to about 500° F. (66° C. to 260° C.). In another embodiment, the bottomhole temperature is in the range of about 180° F. to about 400° F. (82° C. to 204° C.). In another embodiment, the bottomhole temperature is in the range of about 180° F. to about 350° F. (82° C. to 177° C.).

In one embodiment, the subterranean formation is penetrated by a well. The well can be an oil, gas, water, or injection well. According to this embodiment, the step of introducing includes introducing the cement composition into the well. According to another embodiment, the subterranean formation is penetrated by a well and the well includes an annulus. According to this other embodiment, the step of introducing includes introducing the cement composition into a portion of the annulus.

The method also includes the step of allowing the cement composition to set. The step of allowing can be after the step of introducing the cement composition into the subterranean formation. The method can include the additional steps of perforating, fracturing, or performing an acidizing treatment, after the step of allowing.

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

For the data contained in the following tables, the concentration of any ingredient in a suspension or a cement composition can be expressed as: by weight of the suspension (abbreviated as "bws"); or by weight of the cement (abbreviated as "bwc"). HALAD® 344 fluid loss additive is a water-swellable AMPS based random co-polymer, having an average molecular weight of >50,000. SUSPENTONE® suspending agent is a blend of clays with the majority of the blend being organophilic attapulgite. HALAD® 344 EXP is an oil-based suspension containing mineral oil as the continuous phase of the suspension and HALAD® 344 fluid loss additive at a concentration of 38% by weight of the suspension.

Any of the suspensions containing SUSPENTONE® suspending agent were prepared as follows. The organic liquid was heated to a temperature of 176° F. (80° C.). The organic liquid was then added to a pre-heated, hard glass container. The suspending agent was then added to the container and the organic liquid and suspending agent was blended using a constant speed blender at 2,000-3,000 rpm for 5 min. The mixture was cooled to 122° F. (50° C.) and then transferred to a pre-heated constant speed blender (FANN® Instruments, Model 676). The fluid loss additive was then added to the blending container containing the organic liquid/suspending agent mixture. The mixture was then blended in the constant speed blender at 4,000 to 10,000 rpm for 4 to 10 minutes. The suspension was then allowed to cool to ambient temperature (71° F.). All cement compositions were mixed and tested according to the specified procedure for the specific test as described in The Detailed Description section above.

Table 1 contains viscosity data for several concentrates. One of the concentrates was HALAD® 344 EXP. The other two concentrates were organic-based suspensions prepared with an organic liquid of polyethylene glycol (200) (PEG 200) as the continuous phase, HALAD® 344 fluid loss additive at a concentration of 30% bws, and SUSPENTONE® suspending agent at a concentration of 0.75% and 1% bws, respectively. The concentrates were tested for viscosity using a Brookfield viscometer using an S64 spindle at an rpm of 12 and a temperature of 71° F. (22° C.). As can be seen in Table 1, both of the organic-based suspensions exhibited a lower viscosity compared to HALAD® 344 EXP. Also, as can be seen, the organic-based suspension with SUSPENTONE® suspending agent at a concentration of 0.75% bws had a lower viscosity compared to the organic-based suspension with SUSPENTONE® suspending agent at a concentration of 1% bws.

TABLE 1

| Type of Liquid Concentrate | Viscosity (cP) |
| --- | --- |
| HALAD ® 344 EXP | 11,248 |
| Organic-based slurry with 0.75% SUSPENTONE ® | 6,300 |
| Organic-based slurry with 1% SUSPENTONE ® | 9,248 |

Tables 2a and 2b contain rheology and viscosity data for two different concentrates. For Tables 2a and 2b, $k_1$=0.289 in 1/s; and $k_2$=0.703 in Pa. Table 2a contains data for HALAD® 344 EXP. Table 2b contains data for an organic-based suspension containing PEG 200 as the continuous phase, HALAD® 344 fluid loss additive at a concentration of 30% bws, and SUSPENTONE® suspending agent at a concentration of 1% bws.

As can be seen in Tables 2a and 2b, the organic-based suspension (Table 2b) exhibited better rheologies and lower viscosities compared to HALAD® 344 EXP (Table 2a).

TABLE 2a

| rpm | Shear Rate (1/sec) | Dial Reading | Shear Stress (Pa) | Viscosity (Pa * s) | Viscosity (cP) |
| --- | --- | --- | --- | --- | --- |
| 3 | 0.867 | 28 | 19.684 | 22.7036 | 22703.58 |
| 6 | 1.734 | 34 | 23.902 | 13.7843 | 13784.31 |
| 30 | 8.67 | 70 | 49.210 | 5.6759 | 5675.89 |
| 60 | 17.34 | 104 | 73.112 | 4.2164 | 4216.38 |
| 100 | 28.9 | 139 | 97.717 | 3.3812 | 3381.21 |
| 200 | 57.8 | 218 | 153.254 | 2.6515 | 2651.45 |
| 300 | 86.7 | 298 | 209.494 | 2.4163 | 2416.31 |
| 600 | 173.4 | +300 | — | — | — |

TABLE 2b

| rpm | Shear Rate (1/sec) | Dial Reading | Shear Stress (Pa) | Viscosity (Pa * s) | Viscosity (cP) |
| --- | --- | --- | --- | --- | --- |
| 3 | 0.867 | 22 | 15.466 | 17.8385 | 17838.52 |
| 6 | 1.734 | 25 | 17.575 | 10.1355 | 10135.52 |
| 30 | 8.67 | 49 | 34.447 | 3.9731 | 3973.13 |
| 60 | 17.34 | 73 | 51.319 | 2.9596 | 2959.57 |
| 100 | 28.9 | 102 | 71.706 | 2.4812 | 2481.18 |
| 200 | 57.8 | 163 | 114.589 | 1.9825 | 1982.51 |
| 300 | 86.7 | 215 | 151.145 | 1.7433 | 1743.31 |
| 600 | 173.4 | +300 | — | — | — |

Table 3 contains rheology and fluid loss data for two different cement compositions having a density of 16.4 ppg (2 kilograms per liter (kg/l)). In one cement composition, powdered HALAD® 344 fluid loss additive was added to Class H cement and deionized water (DI) to form the cement composition. In another cement composition, an organic-based suspension was prepared with PEG 200 as the continuous phase of the suspension, HALAD® 344 fluid loss additive at a concentration of 30% bws, and SUSPENTONE® suspending agent at a concentration of 1% bws, and the suspension was then added to Class H cement and DI water to form the cement composition. The concentration of HALAD® 344 fluid loss additive, either as a powder or from HALAD® 344 EXP and the organic-based suspensions, is expressed as a percentage by weight of the cement (% bwc) considering the active solid content. For example, if powdered HALAD® 344 fluid loss additive was added at a concentration of 0.6% bwc, then for an organic-based suspension containing HALAD® 344 fluid loss additive at a concentration of 30% bws, a calculated volume of the suspension was added to the cement and water to form a cement composition such that there was 0.6% bwc of HALAD® 344 fluid loss additive in the cement composition. The cement compositions were tested for fluid loss at a temperature of 125° F. (51° C.) and a pressure differential of 1,000 psi (7 MPa).

As can be seen in Table 3, the cement composition containing the organic-based suspension exhibited similar rheologies and fluid loss compared to the cement composition containing HALAD® 344 fluid loss additive as a powder.

TABLE 3

| Source of | Concen. of HALAD® | Temp. (°F.) | Rotational Viscometer | | | | | Fluid Loss (mL/30 min) |
|---|---|---|---|---|---|---|---|---|
| HALAD® 344 | 344 (% bwc) | | 300 | 200 | 100 | 6 | 3 | |
| Powder | 0.6 | 125 | 184 | 142 | 86 | 8 | 7 | 38 |
| Organic-based suspension | 0.6 | 125 | 170 | 127 | 82 | 13 | 8 | 44 |

Table 4 contains thickening time, initial setting time, time to reach 500 psi, and compressive strength data for several cement compositions having a density of 16.4 ppg (2 kg/l). In one cement composition, powdered HALAD® 344 fluid loss additive was added to Class H cement and DI water to form the cement composition. In another cement composition, HALAD® 344 EXP was added to Class H cement and DI water to form the cement composition. In another cement composition, an organic-based suspension was prepared using PEG 200 as the continuous phase, HALAD® 344 fluid loss additive at a concentration of 30% bws, and SUSPENTONE® suspending agent at a concentration of 1% bws, and the suspension was then added to Class H cement and DI water to form the cement composition.

Each of the cement compositions contained HALAD® 344 fluid loss additive at a concentration of 0.6% bwc and HR®5 set retarder at a concentration of 0.2% bwc. The thickening time test was conducted at a temperature of 125° F. (51° C.) and a pressure of 5,160 psi (36 MPa). The tests for initial setting time, time to reach 500 psi, and compressive strength were conducted at a temperature of 125° F. (51° C.) and a pressure of 3,000 psi (21 MPa).

As can be seen in Table 4, the cement composition containing the organic-based suspension had a longer thickening time, initial setting time, and time to reach 500 psi compared to both, the cement composition containing powdered HALAD® 344 fluid loss additive and the cement composition containing HALAD® 344 EXP. The cement composition containing the organic-based suspension had a lower 24 hrs compressive strength compared to both, the cement composition containing HALAD® 344 fluid loss additive as a powder and the cement composition containing HALAD® 344 EXP. These results suggest the organic-based suspension had little retardation effect on the cement composition.

TABLE 4

| Source of HALAD® 344 | Thickening Time (hr:min) | Initial Setting Time (hr:min) | Time to Reach 500 psi (hr:min) | Non-Destructive Compressive Strength at 24 hrs (psi) |
|---|---|---|---|---|
| Powder | 10:27 | 17:35 | 19:38 | 1595.5 |
| HALAD® 344 EXP | 8:15 | 17:36 | 19:36 | 1613.4 |
| Organic-based suspension | 12:07 | 18:53 | 21:15 | 1180.2 |

The experiments for Table 5 were conducted to evaluate the salt tolerance of an organic-based suspension. Table 5 contains rheology and fluid loss data for two different cement compositions having a density of 16.5 ppg (2 kg/l). The cement compositions were tested for fluid loss at a temperature of 135° F. (57° C.) and a pressure differential of 1,000 psi (7 MPa). Each of the cement compositions contained at least Class H cement, DI water, 10% bwc of sodium chloride, 0.6% bwc HALAD® 344 fluid loss additive, and 0.1% bwc of HR®5 set retarder. One of the cement compositions included powdered HALAD® 344 and did not include a suspending agent. The other cement composition included an organic-based suspension that contained PEG 200 as the continuous phase, 30% bws HALAD® 344 fluid loss additive, and 1% bws SUSPENTONE® suspending agent.

As can be seen in Table 5, the cement composition containing the organic-based suspension exhibited similar rheologies and a lower fluid loss compared to the cement composition containing powdered HALAD® 344 fluid loss additive.

TABLE 5

| Source of HALAD® 344 | Temp. (°F.) | Rotational Viscometer | | | | | Fluid Loss (mL/30 min) |
|---|---|---|---|---|---|---|---|
| | | 300 | 200 | 100 | 6 | 3 | |
| Powder | 135 | 169 | 121 | 74 | 16 | 11 | 200.8 |
| Organic-based suspension | 135 | 119 | 90 | 58 | 19 | 15 | 154.9 |

Table 6 contains thickening time, rheology, and fluid loss data for two different cement compositions, having a density of 15.8 ppg (1.9 kg/l). The thickening time test was conducted at a temperature of 125° F. (51° C.) and a pressure of 5,160 psi (36 MPa). The cement compositions were tested for fluid loss at a temperature of 125° F. (51° C.) and a pressure differential of 1,000 psi (7 MPa). In one cement composition, powdered HALAD® 344 fluid loss additive was added to Class G cement and DI water to form the cement composition. In another cement composition, an organic-based suspension was prepared using PEG 200 as the continuous phase, 30% bws HALAD® 344 fluid loss additive, and 1% bws SUSPENTONE® suspending agent, and the suspension was then added to Class G cement and DI water to form the cement composition. Each of the cement compositions contained HALAD® 344 fluid loss additive at a concentration of 0.6% bwc.

As can be seen in Table 6, the cement composition containing the organic-based suspension had a lower thickening time, better rheologies, and a lower fluid loss compared to the cement composition containing powdered HALAD® 344 fluid loss additive. As can also be seen, the organic-based suspension is compatible with Class G cement.

TABLE 6

| Source of HALAD® 344 | Thick. Time (hr:min) | Temp. (°F.) | Rotational Viscometer | | | | | Fluid Loss (mL/30 min) |
|---|---|---|---|---|---|---|---|---|
| | | | 300 | 200 | 100 | 6 | 3 | |
| Powder | 2:00 | 125 | 220 | 187 | 110 | 35 | 25 | 94 |
| Organic-based suspension | 1:52 | 125 | 192 | 146 | 94 | 14 | 9 | 54 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of cementing in a subterranean formation comprising:
    introducing a cement composition into the subterranean formation, the cement composition comprising:
        (i) cement;
        (ii) water; and
        (iii) a well treatment composition comprising:
            (a) a water-soluble, organic liquid, wherein the organic liquid comprises the continuous phase of the well treatment composition, and wherein the organic liquid comprises a polyglycol or a derivative of polyglycol;
            (b) a fluid loss additive, wherein the fluid loss additive is insoluble in the organic liquid, and wherein the fluid loss additive comprises a high molecular weight, water-swellable polymer; and
            (c) a suspending agent, wherein the suspending agent comprises an organophilic clay,
        wherein the well treatment composition has an activity of at least 15%; and
    allowing the cement composition to set.

2. The method according to claim 1, wherein the well treatment composition is homogenous.

3. The method according to claim 1, wherein the well treatment composition is a suspension.

4. The method according to claim 1, wherein the organic liquid is a linear polymer.

5. The method according to claim 4, wherein the organic liquid is selected from the group consisting of, polyether glycol, polyester glycol, polyether ester glycol, and any combination thereof.

6. The method according to claim 5, wherein the organic liquid has an average molecular weight in the range of about 150 to about 1,000.

7. The method according to claim 1, wherein the polymer for the fluid loss additive is selected from the group consisting of: cellulose; guar;
    xanthan; starch; a monomer or monomers selected from the group consisting of acrylamido-methyl-propane sulfonate (AMPS), N-vinyl-N-methylaceamide, N-vinyl-formamide, N-vinylpyrrolidone, acrylonitrile, acrylamide, acrylomorpholine, vinyl alcohol, maleic anhydride, acrylic acid, methacrylic acid; derivatives of any of the foregoing; and any combination thereof.

8. The method according to claim 1, wherein the polymer for the fluid loss additive has an average molecular weight in the range of about 50,000 to about 2,000,000.

9. The method according to claim 1, wherein the fluid loss additive is in a concentration in the range of about 15% to about 80% by weight of the well treatment composition.

10. The method according to claim 1, wherein the organophilic clay is selected from the group consisting of organophilic bentonite, hectorite, attapulgite, sepiolite, and any combination thereof.

11. The method according to claim 1, wherein the suspending agent is in a concentration in the range of about 0.05% to about 5% by weight of the well treatment composition.

12. The method according to claim 1, wherein the fluid loss additive is in a concentration in the range of about 0.05% to about 5% by weight of the cement.

13. The method according to claim 1, wherein the suspending agent is in a concentration in the range of about 0.01% to about 2% by weight of the cement.

14. The method according to claim 1, wherein the cement composition has an API fluid loss of less than 155 mL/30 min at a temperature of 125° F. (51° C.) and a pressure differential of 1,000 psi (7 megapascals).

15. The method according to claim 1, wherein the fluid loss additive is in at least a sufficient concentration such that the cement composition has an API fluid loss of less than 155 mL/30 min at a temperature of 125° F. (51° C.) and a pressure differential of 1,000 psi (7 megapascals).

16. The method according to claim 1, wherein the cement composition has a thickening time of at least 3 hours at a temperature of 125° F. (51° C.) and a pressure of 5,160 psi (36 megapascals).

17. The method according to claim 1, wherein the cement composition has a setting time of less than 48 hours at a temperature of 125° F. (51° C.).

18. The method according to claim 1, wherein the step of introducing is selected from the group consisting of: well completion; foam cementing; primary or secondary cementing operations; well-plugging; gravel packing; and combinations thereof.

19. The method according to claim 1, wherein the subterranean formation is penetrated by a well and the step of introducing is into the well.

* * * * *